United States Patent
Fernandez Aymerich et al.

(10) Patent No.: US 11,260,598 B2
(45) Date of Patent: Mar. 1, 2022

(54) CONTROLLING HEAT SOURCES BASED ON REPRESENTATIVE TEMPERATURES

(71) Applicant: HEWLETT-PACKARD DEVELOPMENT COMPANY, L.P., Houston, TX (US)

(72) Inventors: Ismael Fernandez Aymerich, Sant Cugat del Valles (ES); Lluis Abello Rosello, Terragona (ES); Sergio Puigardeu Aramendia, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 873 days.

(21) Appl. No.: 15/948,438

(22) Filed: Apr. 9, 2018

(65) Prior Publication Data

US 2019/0308372 A1 Oct. 10, 2019

(51) Int. Cl.

| | |
|---|---|
| *B29C 64/393* | (2017.01) |
| *B33Y 50/02* | (2015.01) |
| *B33Y 30/00* | (2015.01) |
| *B29C 64/165* | (2017.01) |
| *B28B 1/00* | (2006.01) |

(Continued)

(52) U.S. Cl.
CPC ............ *B29C 64/393* (2017.08); *B22F 10/20* (2021.01); *B28B 1/001* (2013.01); *B28B 17/0081* (2013.01); *B29C 64/153* (2017.08); *B29C 64/165* (2017.08); *B29C 64/188* (2017.08); *B29C 64/295* (2017.08); *B33Y 10/00* (2014.12);

(Continued)

(58) Field of Classification Search
CPC ..... B29C 64/393; B29C 64/40; B29C 64/379; B29C 64/307; B29C 64/295; B29C 64/277; B29C 64/282; B29C 64/264; B29C 64/20; B29C 64/171; B29C 64/153; B29C 64/129; B29C 64/135; B29C 64/118; B29C 64/10; B29C 64/00; B29C 2043/5816; B29C 49/786; B29C 64/7411; B29C 65/7411; B29C 66/347; B29C 66/9141; B29C 66/91411
See application file for complete search history.

(56) References Cited

U.S. PATENT DOCUMENTS

| | | | |
|---|---|---|---|
| 9,168,698 B2 | 10/2015 | Kemperle et al. | |
| 2008/0262659 A1* | 10/2008 | Huskamp | G05D 23/27 700/300 |

(Continued)

FOREIGN PATENT DOCUMENTS

| | | |
|---|---|---|
| WO | WO-2016209233 A1 | 12/2016 |
| WO | WO-2017030586 A1 | 2/2017 |

*Primary Examiner* — Stella K Yi
(74) *Attorney, Agent, or Firm* — HP Inc. Patent Department (57) ABSTRACT

In an example, a method includes measuring a temperature of a plurality of regions of a layer of build material in an additive manufacturing apparatus to provide initial temperature values. For each of a plurality of regions which comprise build material which is intended to fuse, an average temperature value of a plurality of neighbouring regions may be determined and the initial temperature values may be replaced with the average temperature value. Based on the replacement temperature values, a representative temperature of an area of the layer of build material may be determined and a heat source may be controlled based on the representative temperature.

13 Claims, 8 Drawing Sheets

(51) Int. Cl.
 *B28B 17/00* (2006.01)
 *B29C 64/153* (2017.01)
 *B29C 64/188* (2017.01)
 *B29C 64/295* (2017.01)
 *G05D 23/19* (2006.01)
 *B33Y 10/00* (2015.01)
 *B22F 10/20* (2021.01)
 *B22F 10/30* (2021.01)

(52) U.S. Cl.
 CPC ............... *B33Y 30/00* (2014.12); *B33Y 50/02* (2014.12); *G05D 23/1917* (2013.01); *B22F 10/30* (2021.01)

(56) References Cited

U.S. PATENT DOCUMENTS

| | | |
|---|---|---|
| 2016/0325496 A1 | 11/2016 | De Pena et al. |
| 2016/0332384 A1* | 11/2016 | De Pena ................ B33Y 30/00 |
| 2017/0234817 A1 | 8/2017 | Bischof et al. |
| 2017/0239721 A1 | 8/2017 | Buller et al. |
| 2017/0252815 A1 | 9/2017 | Fontana et al. |
| 2018/0001557 A1 | 1/2018 | Buller et al. |

* cited by examiner

|     | 204a |     |     |     |     |     | 202 |     |     |     |     |     |     | 204b |     |     |
|-----|------|-----|-----|-----|-----|-----|-----|-----|-----|-----|-----|-----|-----|------|-----|-----|
| 153 | 153  | 155 | 157 | 157 | 149 | 154 | 158 | 158 | 157 | 156 | 155 | 149 | 134 | 159  | 159 | 158 |
| 154 | 152  | 148 | 159 | 161 | 161 | 163 | 161 | 163 | 162 | 161 | 160 | 163 | 163 | 155  | 160 | 158 |
| 155 | 155  | 150 | 165 | 162 | 162 | 162 | 163 | 163 | 162 | 163 | 160 | 164 | 161 | 159  | 159 | 161 |
| 156 | 155  | 162 | 161 | 161 | 163 | 161 | 164 | 164 | 163 | 163 | 160 | 163 | 161 | 163  | 155 | 159 |
| 153 | 161  | 163 | 161 | 163 | 161 | 163 | 166 | 165 | 163 | 161 | 160 | 161 | 163 | 160  | 163 | 153 |
| 151 | 163  | 161 | 162 | 162 | 163 | 163 | 166 | 165 | 164 | 163 | 160 | 149 | 153 | 160  | 164 | 151 |
| 154 | 161  | 163 | 163 | 161 | 169 | 168 | 166 | 166 | 165 | 160 | 161 | 163 | 161 | 163  | 161 | 154 |
| 163 | 149  | 153 | 161 | 163 | 169 | 166 | 166 | 166 | 167 | 167 | 166 | 167 | 163 | 163  | 163 | 163 |
| 161 | 163  | 161 | 163 | 166 | 167 | 166 | 166 | 167 | 167 | 167 | 167 | 165 | 163 | 160  | 163 | 161 |
| 163 | 161  | 163 | 169 | 167 | 166 | 166 | 166 | 166 | 167 | 167 | 167 | 168 | 153 | 160  | 161 | 163 |
| 153 | 149  | 153 | 157 | 169 | 166 | 166 | 166 | 166 | 167 | 167 | 167 | 166 | 162 | 163  | 149 | 153 |
| 156 | 163  | 161 | 163 | 166 | 164 | 165 | 166 | 166 | 167 | 167 | 168 | 167 | 161 | 161  | 163 | 156 |
| 154 | 163  | 161 | 163 | 168 | 163 | 166 | 166 | 166 | 167 | 167 | 168 | 169 | 163 | 163  | 163 | 169 |
| 163 | 163  | 161 | 162 | 163 | 163 | 167 | 165 | 166 | 165 | 167 | 168 | 168 | 163 | 153  | 153 | 157 |
| 161 | 161  | 163 | 161 | 163 | 166 | 165 | 167 | 168 | 167 | 165 | 163 | 165 | 161 | 161  | 163 | 151 |
| 153 | 149  | 153 | 163 | 161 | 163 | 160 | 163 | 161 | 161 | 160 | 163 | 163 | 161 | 163  | 160 | 158 |
| 155 | 155  | 165 | 161 | 161 | 163 | 161 | 163 | 160 | 160 | 162 | 162 | 162 | 163 | 163  | 155 | 158 |
| 156 | 154  | 148 | 159 | 169 | 161 | 163 | 169 | 163 | 162 | 161 | 160 | 169 | 163 | 154  | 156 | 157 |
| 157 | 157  | 157 | 157 | 157 | 149 | 153 | 157 | 158 | 157 | 156 | 154 | 144 | 136 | 153  | 155 | 156 |
|     | 204c |     |     |     |     |     |     |     |     |     |     |     |     | 204d |     |     |

Fig. 2F

Determine 1st replacement temperature value comprising a weighted average value of neighbouring regions on a 1st and 2nd side of each region. — 302

Determine 2nd replacement temperature value comprising a weighted average value of neighbouring regions on a 3rd and 4th side of each region. — 304

CONTROLLING HEAT SOURCES BASED ON REPRESENTATIVE TEMPERATURES

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification and/or binding methods may be used.

BRIEF DESCRIPTION OF DRAWINGS

Non-limiting examples will now be described with reference to the accompanying drawings, in which:

FIGS. 2A-2F are examples of pixels in heat maps;

FIG. 3 is an example of a method of determining an average value;

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied.

Some 3D printing technology works by generating layers of a given thickness, one on top of another. Build material may be deposited, for example, on a print bed, and processed layer by layer, for example within a fabrication chamber or "build volume" of the printer. The build material may be a powder-like granular material, which may for example be a plastic, ceramic or metal powder. According to one example, a suitable build material may be PA12 build material commercially known as V1R10A "HP PA12" available from HP Inc.

In some examples, at least one print agent may be selectively applied to the build material, and may be liquid when applied. For example, a fusing agent (also termed a "coalescence agent" or "coalescing agent") may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern.

According to one example, a suitable fusing agent may be an ink-type formulation comprising carbon black, such as, for example, the fusing agent formulation commercially known as V1Q60Q "HP fusing agent" available from HP Inc. In some examples such a fusing agent may additionally comprise an infra-red light absorber. In some examples such a fusing agent may additionally comprise a near infra-red light absorber. In some examples such a fusing agent may additionally comprise a visible light absorber. In some examples such a fusing agent may additionally comprise a UV light absorber. Examples of print agents comprising visible light enhancers are dye based colored ink and pigment based colored ink, such as inks commercially known as CE039A and CE042A available from HP Inc.

In other examples, coalescence may be achieved in some other manner.

In some examples, a detailing agent may also be used (also termed a "coalescence modifier agent" or "coalescing modifier agent"), which may have a cooling effect. In some examples, the detailing agent may be used near edge surfaces of an object being printed. According to one example, a suitable detailing agent may be a formulation commercially known as V1Q61A "HP detailing agent" available from HP Inc.

A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

In some examples of additive manufacturing, heat sources (for example, infrared emitters such as a heat lamp, which may comprise statically mounted heat sources directed at a print bed) are controlled to maintain an appropriate temperature range during object generation. In some examples, a feedback loop is used, and one or more heat sources are controlled according to a measured temperature. In some examples, a layer of build material is divided into a plurality of print bed zones, each associated with a heat source. An average or representative temperature of the build material in each zone may be determined, and the heat source in turn controlled according to that temperature.

In some examples, the reference temperature to be used for a feedback loop is intended to be the temperature of build material in the absence of print agent, which will be referred to herein as 'blank' build material.

However, during an object generation process, portions of a layer of build material may be treated with a print agent, for example any of the print agents described above. For example, fusing agent will tend to increase the temperature in a region and, in particular where the resolution with which the temperature is within that region can be measured is relatively low, this can make it difficult to correctly determine the temperature of blank build material, as some temperature measurements may include both treated and blank build material, or heat may be transferred between treated and blank build material, and this in turn can result in incorrect or sub-optimal control of the heat sources.

Figure 1:
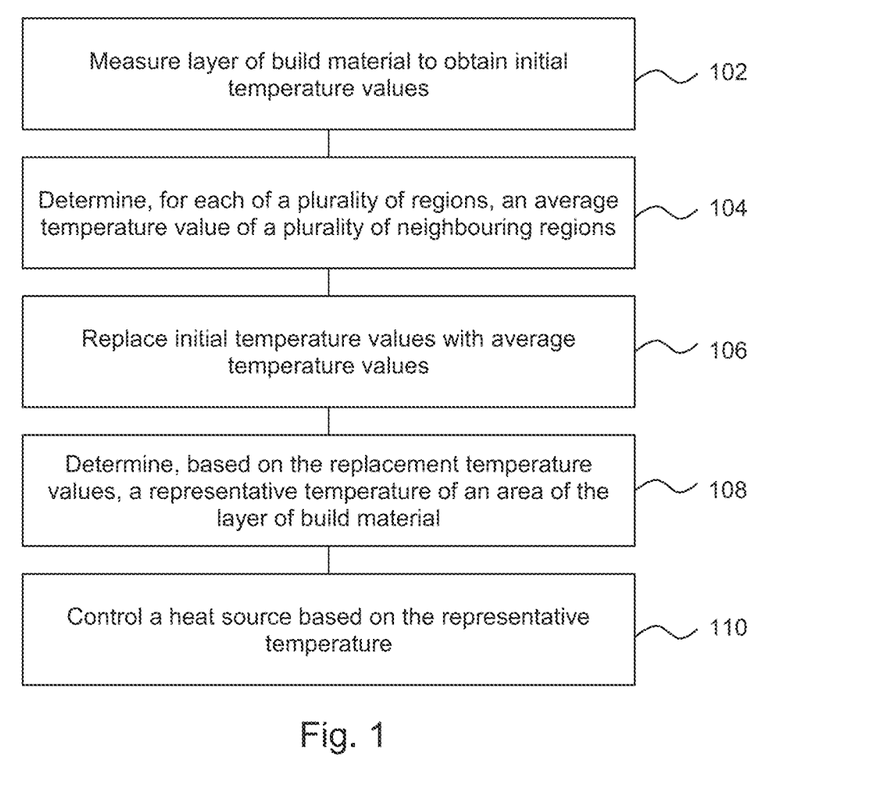
FIG. 1 is an example method of controlling a heat source in additive manufacturing.

FIG. 1 is an example of a method of additive manufacturing, which may be a layer by layer object generation process, otherwise known as 3D printing. In block 102, the temperature of each of a plurality of regions of a layer of build material in an additive manufacturing apparatus is measured to provide initial temperature values. In some examples, a 'heat map' of the layer of build material may be acquired, for example using one or more thermal cameras. The heat map may be made up of an array of pixels, each corresponding to a region of the layer of build material, and the temperature of each of such pixels/regions may be monitored. For example, the array may be on the order of 22-40 pixels square, in some examples being 32 pixels square.

Block 104 comprises determining, for each of a plurality of regions which comprise build material which is intended to fuse, an average temperature value of a plurality of neighbouring regions and block 106 comprises replacing the initial temperature values with the average temperature values. For example, a pixel which comprises a thermal image of a region of the build material which includes at least some build material which is intended to fuse, or which is closer thereto, may have an initial temperature value. This temperature value may, in general, be higher than a temperature value of blank or untreated build material. In this example, such values are replaced by an average temperature value determined by averaging neighbouring regions. The neighbouring regions may comprise regions in which the initial measured temperature is a temperature associated with blank build material and/or previously replaced initial temperature values. In some examples, the initial values of a plurality of regions which comprise build material which is intended to fuse may first be replaced by a null value before being replaced with an average temperature value.

In some examples, the regions which comprise build material which is intended to fuse are determined, at least in part, by reference to control data used to instruct the distribution of print agents. Such control data may be generated based on object model data representing at least a portion of an object to be generated by an additive manufacturing apparatus by fusing build material. The object model data may for example comprise a Computer Aided Design (CAD) model, and/or may for example be a STereoLithographic (STL) data file.

In some examples, these regions may be identified by temperature. For example regions in which pixels which are above a threshold temperature may be identified as relating to build material which is intended to fuse.

Block 108 comprises determining, based on the replacement temperature values, a representative temperature of an area of the layer of build material. For example, this may comprise selecting an area of the layer of build material corresponding to a particular heat source (a 'print bed zone'). An average temperature, which may include an average of initial temperatures and/or of at least some replacement temperatures determined in blocks 104 and 106 may be determined as a representative temperature for this area. In other examples, the area may comprise the print bed as a whole.

Block 110 comprises controlling a heat source based on the representative temperature. This may for example comprise controlling a power level of a heat source heating the layer of build material. Controlling the power level may comprise controlling the average power level over time, for example using pulse width modulation control, which sets the percentage of time for which a heating element is emitting light. In other examples, the power level of a constant heat output may be controlled.

In some examples, the heat sources may be, for example heat lamps, such as infrared heat lamps. In some examples, there may be an array of heat sources overlying a print bed in an additive manufacturing apparatus. In some examples, there may be on the order of 10, 20, or 50 heat sources. Controlling the heat source in block 110 may be carried out as a 'closed-loop' control process.

By replacing temperatures associated with regions of the build material which are intended to fuse (i.e. those which have fusing agent applied thereto) with average temperatures, a temperature which is more representative of the blank build material temperature may be determined. When compared to, for example, simply replacing a 'hot' pixel with a temperature value from a neighbouring pixel, the method of FIG. 1 results in improved accuracy.

Figure 2A:
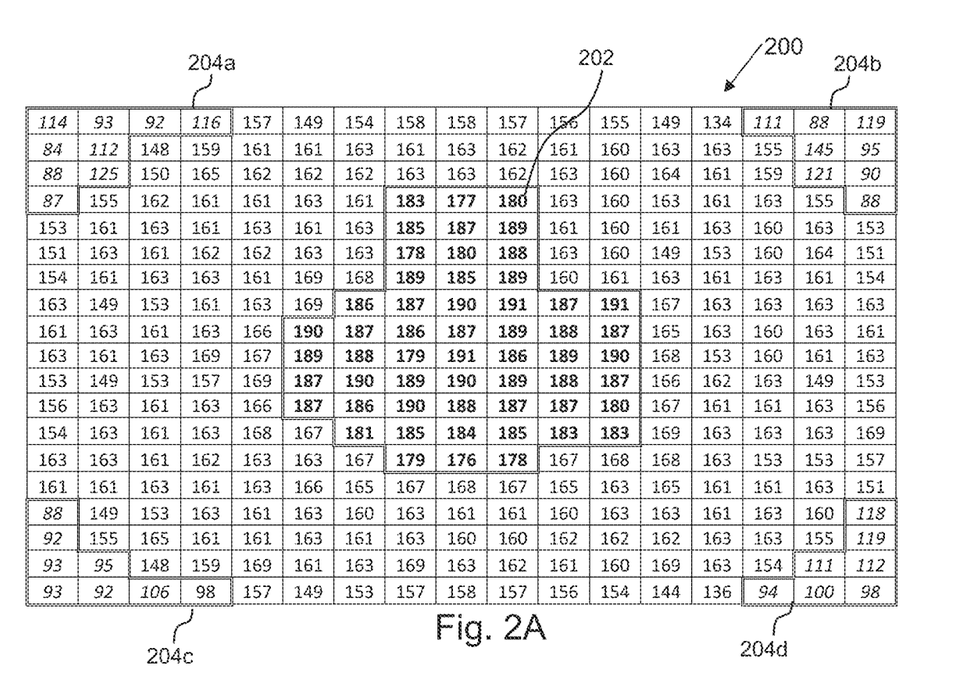

FIG. 2A shows an example of a heat map 200 of a layer of build material during object generation in which centigrade temperature measurements are given as whole numbers (although in practice, temperatures may be recorded to a higher level of accuracy). In a portion 202 of the layer (which comprises a plurality of pixels/regions of the build material which is intended to fuse), solidification of the build material is taking place and the temperature of the pixels therein is generally higher. In addition, it may be noted that in the edge regions 204a-d, the temperature values are generally lower. This is because heat is lost to the environment surrounding the fabrication chamber. It may be noted that the edge region is larger in the corners (or tapers with distance from the corner). This is, at least in part, an artefact of the thermal camera used to measure the temperatures in this example, which is used in association with a fisheye lens. Therefore, the pixels at the corners correspond to a different size of region of the build material than those at the centre. This may not be the case in all examples, for example if an array of temperature sensors which was of a similar size to the print bed was used and therefore such regions may not be present or may differ in appearance in other examples.

Figure 2B:
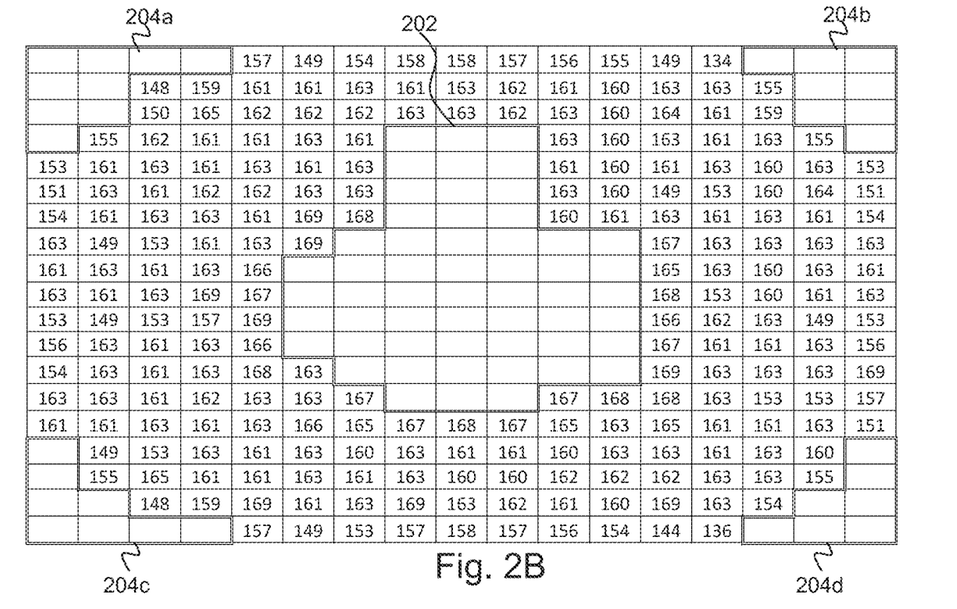

FIG. 2B, shows a version of this in which the data relating to the portion 202 which is intended to fuse and the edge regions 204 has been removed. In some examples, this data may be replaced with a null value of 0 (zero). The remaining temperature values are indicative of the temperature of the blank build material in the layer.

Figure 2C:
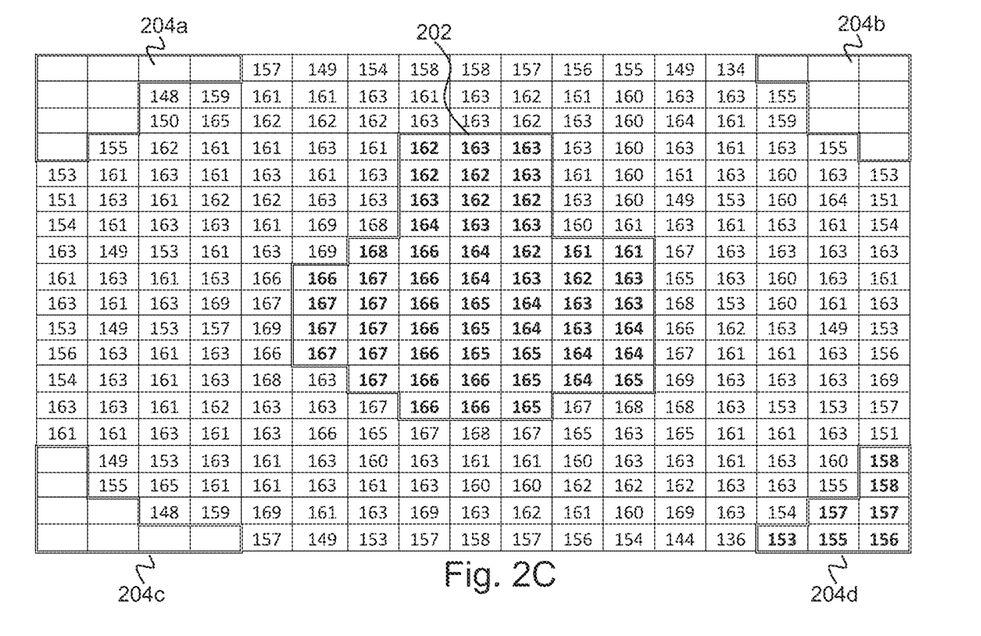
Figure 2D:
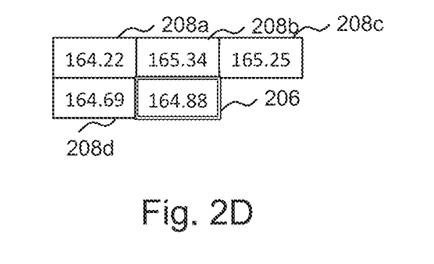

FIGS. 2C and 2D show the result of replacing values with an average value in a first replacement operation. As is shown in FIG. 2D, in this example an average value for a pixel 206 may be determined from four neighbouring pixels 208a-d (which in this example are shown to two decimal places), where neighbouring pixels 208 are selected from a first and second side of the pixel 206 to be overwritten. In this example, the data is replaced in a 'sweep' which starts from the top left-hand of the heat map and extends through to the bottom right of the heat map. In this example, the sweep starts with the first null pixel 206 which has a set of non-null neighbour pixels 208. While four neighbour pixels 208 have been used for determining the average in this example, more or fewer pixels may be used in other examples. In addition, while the neighbour pixels are direct neighbours in this example (i.e. they adjoin the pixel whose value is to be replaced), in other examples, the neighbour pixels may be from the vicinity of the pixel whose value is to be replaced, but not directed adjoining that pixel.

Figure 2E:
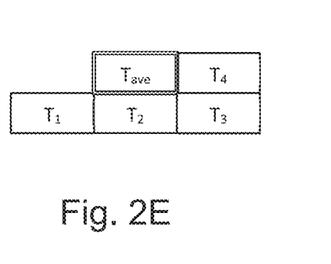

Therefore, selecting neighbouring pixels which are to the left and above the pixel to be overwritten sweeps data through the heat map 200. In some examples, there may be a second sweep through the data, for example starting from the bottom right-hand corner and ending in the top left-hand corner. In the second sweep, an average may be based on pixels which are to the right and below the pixel to be overwritten, as is shown in FIG. 2E (in which $T_{ave}$ is the average of $T_1$, $T_2$, $T_3$ and $T_4$), and FIG. 2F. This may propagate values into the top and/or left-hand corners. In this example, all pixels which are shown as null value or '0' pixels in FIG. 2B are replaced (meaning that some null pixels may be overwritten twice: first with an initial replacement average value and then with a second replacement average value).

Thus, FIG. 2F shows an example of a heat map with the temperature values of a portion 202 which comprises build material which is intended to fuse and the temperature values of regions 204 which are in a boundary zone of the layer have been replaced with an average temperature based on neighbouring regions.

FIG. 3 is an example of a method for carrying out blocks 104 and 106 of FIG. 1.

Block 302 comprises, determining, for a plurality of regions, a first replacement temperature value comprising a weighted average value of neighbouring regions on a first and second side of each region. For example, this may comprise the left and top side of the pixel, as described above in relation to FIGS. 2C and 2D. Therefore, this may comprise carrying out a first sweep e.g. top left to bottom right as described above. Block 304 comprises determining, for a plurality of regions, a second replacement temperature value comprising a weighted average value of neighbouring regions on a third and fourth side region. This may for example comprise the right and under side of the pixel, as described above in relation to FIGS. 2E and 2F. In some examples, this may comprise carrying out a second sweep, e.g. bottom right top left as described above. More generally, the first and second sides may be adjoining orthogonal sides, and the third and fourth sides may be adjoining orthogonal sides.

In this example, in both the first and second sweep, the temperature values of pixels/regions which are not initially representative of the temperature of blank build material may be replaced, whereas the temperature values of pixels/regions which are representative of the temperature of blank build material may remain as initially measured. However in other examples, additional smoothing may be carried out, and/or a first replacement average value may not be overwritten by a second replacement average value.

In the example of FIG. 3, the average values are weighted values. For example, the weighting may be indicative of whether the temperature value of the neighbouring region is an initial value or a replacement value. Further, in some examples, the weighting may indicate the number of initial values which we used to determine the replacement value. Thus, for the sake of example, if a value contributing to the average is an initial value, this may have a weighting of 5. If the value is a replacement value which was determined using three initial values and one replacement value, this may have a weighting of 4. If the value is a replacement value which was determined using two initial values and two replacement values, it may have a weighting of 3. If the value is a replacement value which was determined using one initial value and three replacement values, it may have a weighting of 2. If the value is a replacement value which was determined using four replacement values, it may have a weighting of 1.

In other examples a more complete history of the weight of initial values remaining in a replacement value may be used to determine its weighting in an average.

This method may be carried out for regions of the build material which are intended to fuse and/or for at least one region which are within the boundary zone of the layer. In such examples, a representative temperature of an area of the layer of build material may be determined based on the replacement temperature values of the regions which correspond to portions of the layer which are intended to fuse and those which are in the boundary zone.

Figure 4:
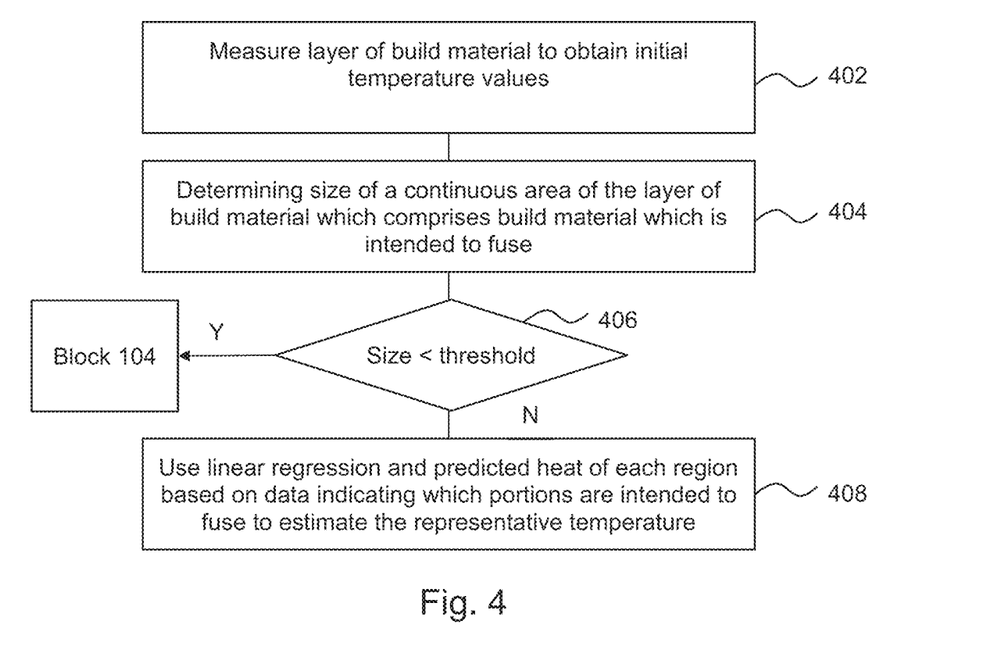
FIG. 4 is an example of a method for determining a representative temperature in additive manufacturing.

FIG. 4 is another example of a method of additive manufacturing comprising, in block 402, measuring the temperature of a plurality of regions of the layer of build material in an additive manufacturing apparatus to provide initial temperature values. The operation may be carried out as described above in relation to block 102.

Block 404 comprises determining the size of a continuous area of the layer of build material which comprises build material which is intended to fuse. This may be determined based on control data, object model data, or thermal data such as measured temperature, as described above in relation to block 404. In some examples, there may be several regions which are intended to fuse and each of these regions may be considered individually.

Block 406 comprises comparing the size to a threshold size. In the event that the size is below the threshold size, the method proceeds with block 104 of FIG. 1. However, in the event that the size is above the threshold size, the method continues with block 408 which comprises using a linear regression and a predicted heat of each region based on data indicating the portions of the layer which are intended to fuse to estimate the representative temperature.

Therefore, in this example, there are two methods which may be used to replace data to determine a representative temperature. The method of FIG. 1 may be used for continuous regions up to a threshold size and the method of block 408 may be used for regions above this size. The threshold size may be determined for each of a plurality of print bed zones, the zones being associated with different heat sources.

Figure 5:
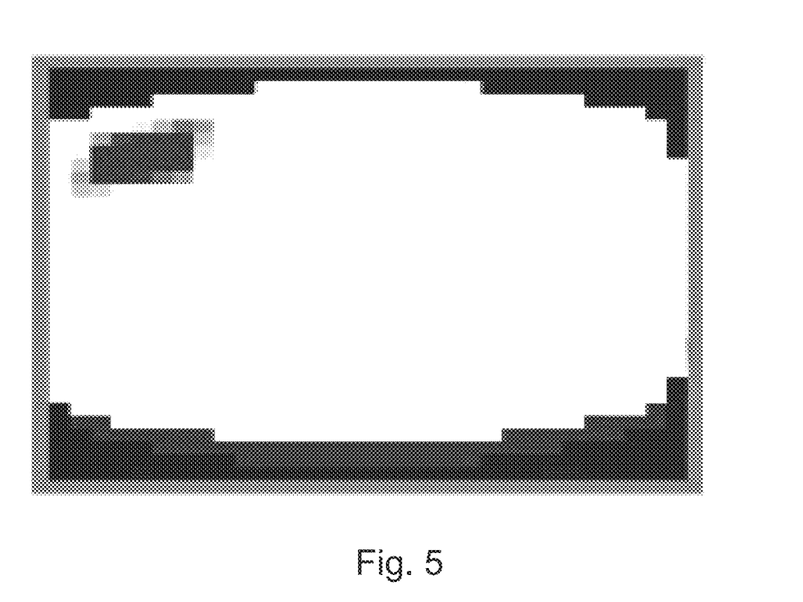
FIG. 5 is an example of a heat map.

FIG. 5 shows an example of a heat map of a zone of a layer of build material associated with a particular heat source in which a large proportion (the white portion) is intended to fuse. The zone may be one of, for example twelve zones of the layer.

In some examples, a predicted heat of each region may be determined based on an amount of print agent to be applied thereto and, in some examples, the predicted temperature of surrounding regions. When predicting temperatures, any optical distortion, for example due to fisheye lens(es) applied to the thermal camera, as is shown in FIG. 5, or the like, may be taken into account.

This can be used to determine a 'grey level' characterising the expected temperature of each pixel. In some examples, untreated powder may be associated with a grey level value of 0. However, as detailed above, in some examples detailing agent may be used to cool powder. Therefore, in some examples, the grey level associated with such detailing agents may for example be in the region of 0 to 20, the white powder may be associated with a grey level of around 20 to 25 (in some examples 23) and pixels associated with the application of fusing agent may be associated with higher grey level values. The grey levels for each pixel may then be plotted against the measured temperature value for that pixel. In some examples, an average of the measured temperatures for all pixels with a particular assigned grey level may be determined.

Figure 6:
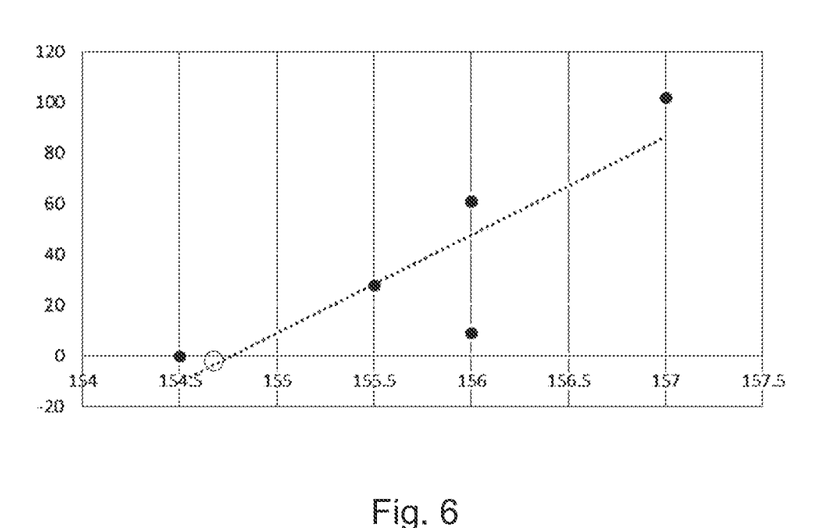
FIG. 6 is an example of a chart for determining a representative temperature in additive manufacturing.

For example, in a particular zone it may be expected that eight pixels are associated with the temperature of blank build material (in this example grey level equal to 0), six pixels may be associated with a grey level of 9 (for example, this may represent pixels with some thermal contribution from adjacent pixels to which fusing agent has been applied), two pixels may be associated with a grey level of 28, two pixels may be associated with a grey level of 61 and one pixel may be associated with a grey level of 102 (i.e. a reasonably large amount of fusing agent may be applied to the region of the build material captured in that pixel). In this example, the average measured temperature of the pixels with a grey level of 0 is 154.50° C. The average measured temperature value of the pixels with a grey level of 9 is 156.00° C. The average measured temperature of the pixels with a grey level of 28 is 155.50° C. The measured temperature of the pixel with a grey level of 61 is 156.00° C. and the measured temperature of the pixel with a grey level of 102 is 157.00° C.

FIG. 6 shows a plot of these grey levels against the averages of the measured temperatures. The zero crossing point of a 'best fit' line provides the representative temperature in this example. Therefore, this method uses linear regression to determine the representative temperature.

In some examples, the linear regression may be carried out for a plurality of zones, each zone being associated with a different heat source. In one example, a linear regression may be carried out for each of a plurality of zones separately.

Figure 7:
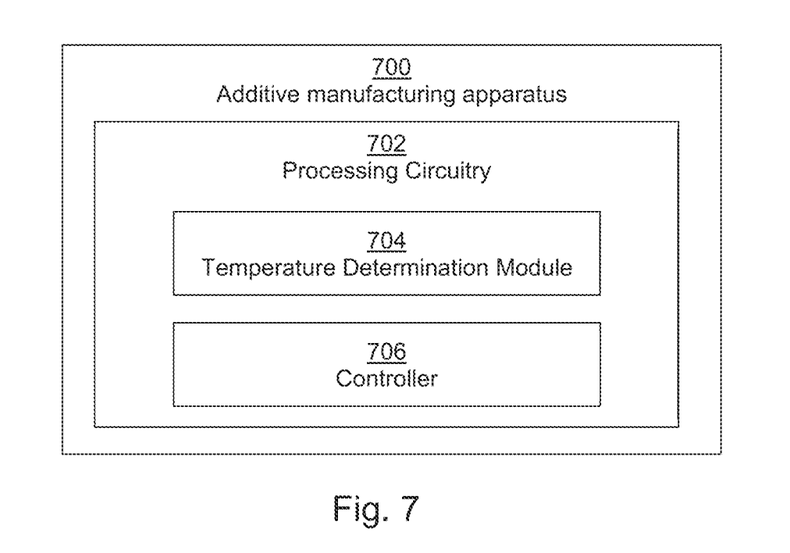
FIG. 7 is an example of an additive manufacturing apparatus.

FIG. 7 is an example of an additive manufacturing apparatus 700 comprising processing circuitry 702, the processing circuitry 702 comprises a temperature determination module 704 and a controller 706.

The temperature determination module 704 is, in use of the apparatus, to determine a representative temperature of the layer of build material by replacing measured temperature values of a pixel of a heat map of the layer which comprises build material which is intended to fuse with average temperatures of neighbouring pixels. For example, this may comprise carrying out the methods of FIG. 1 and FIG. 2 described above.

The controller 706 is to control at least one heat source based on the representative temperature value of the layer of build material.

Figure 8:
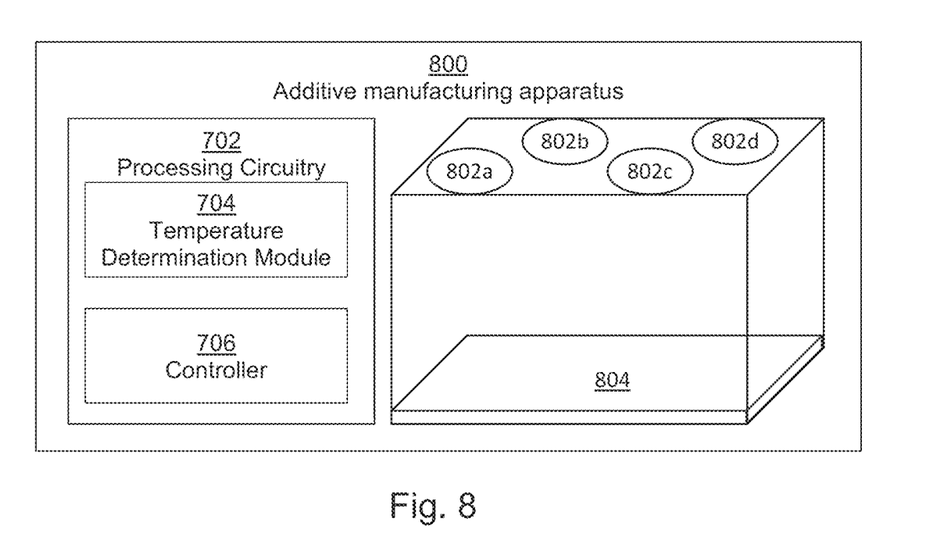
FIG. 8 is another example of an additive manufacturing apparatus.

FIG. 8 shows an example of an additive manufacturing apparatus 800 comprising the processing circuitry 702 including the temperature determination module 704 and the controller 706 of FIG. 7. In addition, the additive manufacturing apparatus 800 comprises a plurality of heat sources 802a-d and a print bed 804 (although it will be understood that the print bed 804 and/or the heat sources 802a-d may be supplied separately from other additive manufacturing apparatus components).

The heat sources 802 are arranged in an array, each heat source 802 being associated with a zone of the print bed 804. In this example, the temperature determination module 704 is to determine a plurality of representative temperature is a different zones of a layer of build material and the controller 706 is to control a plurality of heat sources based on the representative temperature value for an associated zone.

In some examples, the additive manufacturing apparatus 700, 800 may comprise or otherwise be provided with or operate in association with temperature sensing apparatus. Such temperature sensing apparatus may for example comprise a thermal imaging camera to obtain a thermal image/heat map of the print bed, wherein the thermal image/heat map comprises a plurality of pixels, each pixel having an associated measured temperature. In other examples, temperature sensing apparatus may comprise a thermal imaging sensor array, or some other thermal sensing apparatus, and may be used to determine one or more temperatures (which may be pixels of a heat map).

The additive manufacturing apparatus 700, 800 may generate objects in a layer-wise manner by selectively solidifying portions of layers of build materials. The selective solidification may in some examples be achieved by selectively applying print agents, for example through use of 'inkjet' liquid distribution technologies, and applying energy, for example heat, to each layer. The additive manufacturing apparatus 700, 800 may comprise additional components not shown herein, for example a fabrication chamber, at least one print head for distributing print agents, a build material distribution system for providing layers of build material and the like.

The additive manufacturing apparatus 700, 800 may, in some examples, carry out at least one of the blocks of FIG. 1, 3 or 4.

Figure 9:
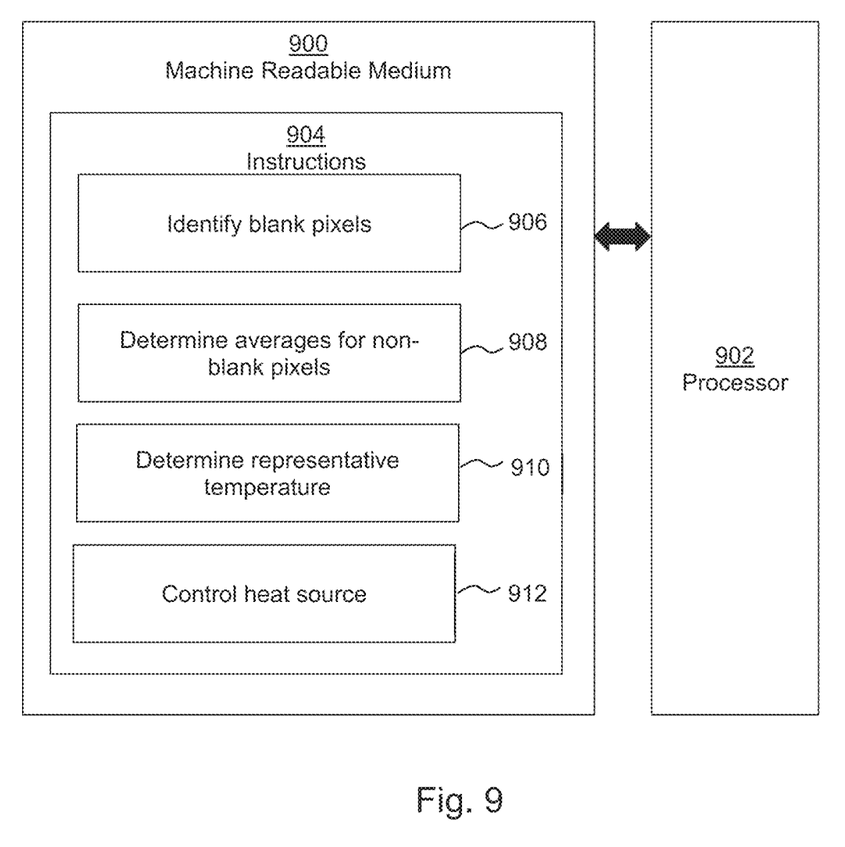
FIG. 9 is an example machine readable medium associated with a processor.

FIG. 9 shows an example of a tangible machine readable medium 900 in association with a processor 902. The machine readable medium 900 stores instructions 904 which, when executed by the processor 902 cause the processor to carry out actions.

In this example, the instructions 904 comprise instructions 906 to identify, from a heat map of the layer of build material in an additive manufacturing apparatus comprising a plurality of pixels, the pixels which are directly indicative of a temperature of the layer in the absence of applied print agent, i.e. the blank pixels. The instructions 904 further comprise instructions 908 to cause the processor 902 to determine, for a plurality of pixels which are not directly indicative of a temperature of the layer in the absence of applied print agent (e.g. treated and/or edge pixels), an average temperature value of a plurality of neighbouring regions. The instructions 904 further comprise instructions 910 to cause the processor 902 to determine, based on the directly indicative pixels and the determined average temperature values, a representative temperature of an area of the layer of build material. The instructions 904 further comprise instructions 912 to cause the processor 902 to control a heat source based on the representative temperature.

In some examples, the instructions 906 may comprise instructions to determine the pixels based on data modeling the content of a fabrication chamber. In other examples, the blank pixels may be identified based on control data (for example specifying where print agents have been/are to be placed), and/or measured temperature values, for example based on threshold values.

In some examples, the instructions 908 to determine an average temperature value comprise, for at least one pixel which is not directly indicative of a temperature of the layer in the absence of applied print agent, instructions to determine a first average temperature value of a first plurality of neighbouring regions, and a second average temperature value of a second plurality of neighbouring regions.

In some examples, the instructions 904 may comprise instructions to cause the processor 902 to determine the size of a continuous set of pixels which are not directly indicative of a temperature of the layer in the absence of applied print agent, and when the area is below a threshold size, determining the average temperatures, and, when the area is at least a threshold size, using a linear regression and a predicted heat of each region to determine a representative temperature.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the temperature determination module 704 and the controller 706) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims, in any combination.

The inventioned claimed is:

1. A method comprising:
   measuring a temperature of a plurality of regions of a layer of build material in an additive manufacturing apparatus to provide initial temperature values;
   determining, for each of a plurality of regions which comprise build material which is intended to fuse, an average temperature value of a plurality of neighbouring regions;
   replacing the initial temperature values with the average temperature values;
   determining, based on the replacement temperature values, a representative temperature of an area of the layer of build material; and
   controlling a heat source based on the representative temperature.

2. A method according to claim 1 wherein the method comprises:
   a first iteration, for a plurality of regions, determining a first replacement temperature value comprising an average value of neighbouring regions on a first and second side of a region; and
   a second iteration, for a plurality of regions, determining a second replacement temperature value comprising an average value of neighbouring regions on a third and fourth side of a region,
   wherein the representative temperature is based on the second replacement temperature values.

3. A method according to claim 1 further comprising determining an indication of a size of a continuous area of the layer of build material which comprises build material which is intended to fuse and determining the replacement temperature values for the area when it is determined that the continuous area is below a threshold size.

4. A method according to claim 3, further comprising, when it is determined that the continuous area is above a threshold size, using a linear regression and a predicted heat of each region based on data indicating portions of the layer which are intended to fuse to estimate the representative temperature.

5. A method according to claim 1 wherein the average temperatures value is a weighted average, wherein at least one weighting is indicative of whether the temperature value of a neighbouring region is an initial value or a replacement value.

6. A method according to claim 5 wherein the weighting is indicative of how many initial values were used in determining a replacement value of that region.

7. A method according to claim 1 further comprising determining, for each of a plurality of regions which are in a boundary zone of the layer, an average temperature value of a plurality of neighbouring regions; and
   replacing the initial temperature values with the average temperature values,
   wherein determining, based on the replacement temperature values, a representative temperature of an area of the layer of build material comprises determining the temperature based on the replacement temperature values of the regions in the boundary zone.

8. A method according to claim 1 comprising determining a representative temperature for each of a plurality of print bed zones and controlling a plurality of heat sources based on the representative temperature of an associated print bed zone.

9. The method of claim 1, wherein each pixel of a thermal image of the layer of build material is used as a region for which the average temperature value of a plurality of neighbouring regions is determined, an initial temperature value for a number of the pixels being replaced with such an average temperature value.

10. The method of claim 1, wherein each area for which a representative temperature is determined comprises a plurality of the regions for which a replacement temperature is determined, each area corresponding to a different heat source among a plurality of heat sources.

11. The method of claim 1, further comprising determining each of the plurality of regions which comprise build material which is intended to fuse using control data that instructs distribution of print agents.

12. The method of claim 9, further comprising determining an average temperature value to replace an initial temperature value for each pixel in a sweep pattern from a first corner of the thermal image to an opposite corner of the thermal image.

13. The method of claim 12, further comprising a second iteration of determining an average temperature value to replace a current temperature value for each pixel in a second sweep pattern from the opposite corner of the thermal image back to the first corner of the thermal image.

\* \* \* \* \*